3,494,720
BIS(SULFATOMETHYL)PHOSPHINIC ACID
Leon H. Chance, New Orleans, La., assignor to the United States of America as represented by the Secretary of Agriculture
No Drawing. Filed Sept. 8, 1967, Ser. No. 667,325
Int. Cl. D06m 13/26
U.S. Cl. 8—120   1 Claim

ABSTRACT OF THE DISCLOSURE

This invention relates to bis(sulfatomethyl)phosphinic acid, methods for preparing same and to a certain sodium derivative thereof. More particularly, this invention relates to the preparation of bis(sulfatomethyl)phosphinic acid by the reaction between bis(hydroxymethyl)phosphinic acid in some suitable inert organic solvent and some sulfating agent. Still more particularly, this invention relates to a reaction between bis(sulfatomethyl)phosphinic acid with soda cellulose to give a material insoluble in cupriethylenediamine hydroxide and with the ability to dye a much darker shade with methylene blue.

---

A non-exclusive, irrevocable, royalty-free license in the invention herein described throughout the world for all purposes of the United States Government, with the power to grant sublicenses for such purposes, is hereby granted to the Government of the United States of America.

An object of this invention is to provide a method for preparing at will bis(sulfatomethyl)phosphinic acid. A further object of this invention is to prepare the sodium salt of bis(sulfatomethyl)phosphinic acid. A still further object of the present invention is to provide a method for preparing at will cellulose fabrics impregnated with bis(sulfatomethyl)phosphinic acid to give a fabric insoluble in cupriethylenediamine hydroxide and with the ability to dye a much darker shade with methylene blue.

This invention relates to new compositions of matter and to the methods for their preparation. According to this invention, the reaction for the preparation of bis(sulfatomethyl)phosphinic acid proceeds according to the following equation:

The reaction is best carried out in a suitable inert organic solvent. A polar solvent such as chloroform is preferable. The reaction is carried out between temperatures of 10° to 70° C. The initial stage of the reaction is best carried out at about 10°–15° C. and then from 60° to 70° to insure complete reaction. Since bis(sulfatomethyl)phosphinic acid is deliquescent, it is best to isolate it in pure form as a metal salt.

Sulfating agents, such as acetyl sulfuric acid, sulfuric acid or chlorosulforic acid may be used in preparing bis(sulfatomethyl)phosphinic acid. The latter is preferred because the byproduct, HCl, is a gas and is easily removed from the product.

The reaction of bis(sulfatomethyl)phosphinic acid with cellulose is carried out in the presence of excess base. The preferred base is sodium hydroxide. In the presence of excess sodium hydroxide, the reaction actually takes place with soda cellulose and is represented by the following equation:

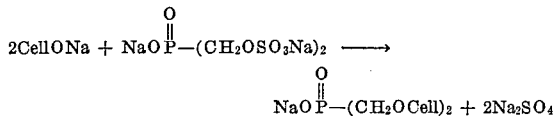

where CellONa is soda cellulose.

The reaction with cotton is carried out by impregnating the cotton with an aqueous solution of the phosphinic acid containing an excess alkali hydroxide in excess of that required to neutralize the acid. It is better to dry the impregnated fabric at about 70° to 100° C. before it is cured at a temperature from 100° to 150° C.

Bis(sulfatomethyl)phosphinic acid is useful as a crosslinking agent for cellulosic materials. For example, cotton fabric reacted with it is rendered insoluble in cupriethylenediamine hydroxide. The latter is a well known solvent for cotton or other cellulosic materials. In addition, the cotton fabric is more readily dyed with basic dyes due to the presence of the phosphinic acid groups. The wet wrinkle recovery of cotton fabric is also improved by crosslinking of the cellulose. The following examples illustrate the details of this invention.

EXAMPLE 1

Bis(hydroxymethyl)phosphinic acid, 51.0 g., was dissolved in 300 ml. of chloroform and placed in a 500 ml. flask equipped with a mechanical stirrer, dropping funnel and reflux condenser equipped with a drying tube. Chlorosulfonic acid, 102.5 g., was added dropwise with stirring over a period of about one hour while maintaining the temperature at 10°–15° C. with external cooling. The cooling bath was removed and stirring continued for an additional hour. Upon cooling, the viscous product turned to a deliquescent cream colored solid. The chloroform was decanted and the solid extracted several times with fresh chloroform to remove excess chlorosulfonic acid. The crude bis(sulfatomethyl)phosphinic acid was dissolved in 300 ml. of distilled water and neutralized to pH 7 by adding 63.6 g. (0.6 mole) of solid sodium carbonate. This indicated a quantitative yield of the acid because the theoretical yield of the acid was 140.8 g. (0.4 mole) and thus would require 0.6 mole of sodium carbonate to neutralize it. The neutralized solution was evaporated at room temperature to a thick mass of crystals. Upon filtration, 105 g. of white crystals of sodium bis(sodium sulfatomethyl)phosphinate were obtained. A second crop of crystals was obtained upon further evaporation of the filtrate. The second crop of crystals contained some viscous material. To separate this material, the crystals were dissolved in water, filtered and the filtrate allowed to evaporate as before. In this manner, an additional 21 g. of white crystals were obtained making a total yield of 126 g. An analytical sample was obtained by recrystallization from a mixture of water and ethanol. Elemental analysis: theoretical percent for sodium bis-(sodium sulfatomethyl)phosphinate, ($C_2H_4O_{10}Na_3PS$), C, 6.82; H, 1.14; P, 8.80; S, 18.21. Found: C, 6.64; H, 1.37; P, 8.64; S, 18.06.

EXAMPLE 2

A solution was prepared by dissolving 5.45 g. of sodium bis(sodium sulfatomethyl)phosphinate in 19.55 g. of 10% aqueous sodium hydroxide. A piece of mercerized cotton printcloth was impregnated with the solution, the excess solution squeezed out by passing through a textile padder. The fabric was dried for 5 minutes at 85° C. and cured for 10 minutes at 150° C. The fabric was then washed free of alkali and dried. The fabric had a weight gain of 3.9%.

A second sample of fabric was treated in the same manner as above except that 15% NaOH was used and the solution was warmed to dissolve all of the sodium salt. A weight gain of 4.5% was obtained on the fabric.

A third sample of cotton fabric was treated in the same manner as the second sample above except the solution contained 2.73 g. of the sodium salt and 22.27 g. of 20% sodium hydroxide. A weight gain of 4.2% was obtained.

A fourth sample of printcloth was treated by impregnating with a 20% aqueous solution of bis(sulfatomethyl) phosphinic acid and then drying. The dried fabric was impregnated with 15% aqueous sodium hydroxide, dried and cured for ten minutes at 150° C. The fabric had a wet wrinkle recovery angle of 231° when measured by the Monsanto wrinkle recovery tester. The untreated cotton fabric had a wet wrinkle recovery angle of 209°.

All of the samples were insoluble in cupriethylenediamine hydroxide. They dyed a darker shade with methylene blue than did the untreated fabrics, indicating a greater susceptibility to basic dyes.

I claim:
1. A process for treating cellulosic fabrics comprising:
  (a) impregnating a cellulosic fabric in an aqueous solution containing about 1 part of the compound represented by the formula

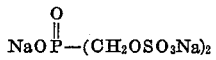

and at least about 3.6 parts of 10% aqueous sodium hydroxide,
  (b) pressing out the excess solution through a textile padder,
  (c) drying and curing the fabric material,
  (d) washing the fabric free of excess reagents.

References Cited
UNITED STATES PATENTS 2,369,443   2/1945   Dickey et al. _____ 260—458

GEORGE F. LESMES, Primary Examiner

J. CANNON, Assistant Examiner

U.S. Cl. X.R.

8—31, 54.2, 100; 260—459